US012320174B2

(12) United States Patent
Vonaesch

(10) Patent No.: US 12,320,174 B2
(45) Date of Patent: Jun. 3, 2025

(54) SLIDING DOOR SYSTEM FOR INSTALLING INTO A BUILDING WALL, AND METHOD FOR SERVICING A SLIDING DOOR SYSTEM

(71) Applicant: Inventio AG, Hergiswil (CH)

(72) Inventor: Jonas Vonaesch, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/560,112

(22) PCT Filed: May 10, 2022

(86) PCT No.: PCT/EP2022/062526
§ 371 (c)(1),
(2) Date: Nov. 10, 2023

(87) PCT Pub. No.: WO2022/243091
PCT Pub. Date: Nov. 24, 2022

(65) Prior Publication Data

US 2024/0229530 A1 Jul. 11, 2024

(30) Foreign Application Priority Data

May 17, 2021 (EP) .................................... 21173992

(51) Int. Cl.
*E05D 15/06* (2006.01)
*E05D 15/48* (2006.01)
*E06B 3/46* (2006.01)

(52) U.S. Cl.
CPC ......... *E05D 15/0604* (2013.01); *E05D 15/48* (2013.01); *E06B 3/4654* (2013.01); *E05D 2015/485* (2013.01); *E05Y 2900/14* (2013.01)

(58) Field of Classification Search
CPC ..... E05D 15/0604; E05D 15/48; E05D 15/10; E05D 2015/485; E06B 3/4654; E06B 3/5409; E06B 3/4645; E05Y 2900/14
(Continued)

(56) References Cited

U.S. PATENT DOCUMENTS 4,754,573 A * 7/1988 van Rooij ............. E06B 3/4654 49/410
11,519,219 B2 * 12/2022 Everett ................. E06B 3/4654

FOREIGN PATENT DOCUMENTS

AT 507815 A1 8/2010
DE 10163061 A1 6/2003
(Continued)

*Primary Examiner* — Marcus Menezes
(74) *Attorney, Agent, or Firm* — William J. Clemens; Shumaker, Loop & Kendrick, LLP

(57) ABSTRACT

A sliding door system includes a sliding door having a first door leaf, a second door leaf and a pivoting mechanism, and a housing for installing into a building wall. The sliding door mounted in the housing is displaceable beyond opposed first and second door openings of the housing. The pivoting mechanism converts a displacement movement of the sliding door into a pivoting movement of the first and second door leaves so that the first and second door leaves expose the first and second door openings respectively in a first position of the sliding door and close the openings in a second position of the sliding door. Deactivating the pivoting mechanism allows the sliding door to be moved beyond the door openings into a third position to service a component of the sliding door and/or to remove the sliding door the first and/or second door opening.

14 Claims, 4 Drawing Sheets

(58) Field of Classification Search
USPC .......... 49/372, 326, 323; 52/206, 207, 204.1
See application file for complete search history.

(56) References Cited

FOREIGN PATENT DOCUMENTS

| | | | |
|---|---|---|---|
| DE | 10163061 | B4 | 6/2003 |
| EP | 1731703 | A2 | 12/2006 |
| EP | 2455573 | A1 | 5/2012 |
| EP | 2871316 | A1 | 5/2015 |
| EP | 2876241 | A1 | 5/2015 |
| WO | 2018065653 | A1 | 4/2018 |

* cited by examiner

SLIDING DOOR SYSTEM FOR INSTALLING INTO A BUILDING WALL, AND METHOD FOR SERVICING A SLIDING DOOR SYSTEM

FIELD

The present invention relates to a sliding door system for installing into a building wall. Furthermore, the invention relates to a method for servicing such a sliding door system.

BACKGROUND

A sliding door can comprise two door leaves arranged opposite one another, which can be pivotably mounted on a horizontally displaceable door leaf support and can be pivoted into corresponding door openings of a building wall when the door leaf support is displaced, for example, by means of an electric drive, by means of a pivoting mechanism. To minimize the effort for repairs and servicing, the sliding door should be easily accessible from the outside and should be easily removable from the building wall.

Examples of different sliding doors are described in AT 507 815 A1, EP 1 731 703 A2, EP 2 871 316 A1 and EP 2 876 241 A1. DE 101 63 061 A1 shows a pivoting mechanism which is designed as a parallelogram guide, and that a distance between the door leaves is predetermined by a link control depending on the position of the sliding door.

Therefore, there may be a need for a sliding door system for installing into a building wall, which simplifies the repair and/or servicing of a sliding door.

SUMMARY

Such a need can be met by the subject matter of any of the advantageous embodiments defined in the following description.

A first aspect of the invention relates to a sliding door system for installing into a building wall. The sliding door system comprises a sliding door comprising a first door leaf, a second door leaf and a pivoting mechanism, and a housing for installing into the building wall and for accommodating the sliding door. The housing has a first door opening and a second door opening opposite the first door opening. The sliding door is mounted in the housing so as to be displaceable beyond the first door opening and second door opening. The pivoting mechanism is designed to convert a displacement movement of the sliding door into a pivoting movement of the first door leaf and of the second door leaf, so that the first door leaf exposes the first door opening and the second door leaf exposes the second door opening in a first position of the sliding door and closes it in a second position of the sliding door. By deactivating the pivoting mechanism, the sliding door can be moved beyond the first door opening and second door opening into a third position, in which at least one component to be serviced of the sliding door system is accessible via the first door opening and/or the second door opening from outside the housing and/or from which the sliding door can be removed from the housing via the first door opening and/or the second door opening.

The housing can comprise, for example, at least one first wall part having the first door opening, a second wall part having the second door opening and a housing frame on which the first and second wall parts are fastened opposite each other at a defined distance from one another. “Wall part” can be understood to mean a flat element such as in the form of a panel or a composite panel. The housing can be inserted into a corresponding recess of the building wall. The sliding door can be mounted in an intermediate space between the first wall part and the second wall part so as to be displaceable.

The term “door leaf” can be understood to mean a flat, for example panel-shaped element, which may also be referred to as a door panel. A height of the door leaf can be, for example, greater than a width of the door leaf, wherein the height and the width can each be significantly greater than a thickness of the door leaf. A sum of the respective thicknesses of the first and second door leaves can be smaller than a distance between the first and second wall parts, so that both door leaves can be accommodated together in the intermediate space between the first and second wall parts.

In a first embodiment, a pivoting mechanism can have a linear guide which allows the first door leaf to change the distance to the second door leaf, preferably in a movement perpendicular to the surface of the first door leaf. Preferably, a plurality of such linear guides is arranged between the first door leaf and the second door leaf. Such linear guides can be designed as linear plain bearings, as linear ball bearings or as scissors mechanisms.

In a second embodiment, the pivoting mechanism can have a parallelogram guide, wherein the door leaves are guided parallel to one another via at least two articulated arms arranged parallel to one another and having the same length. The articulated arms preferably have an angle of 45° or less to the plane of the first door leaf.

The distance between the first door leaf and the second door leaf is preferably predetermined by one or more link controls, with each of which a pin arranged on a door leaf engages. By displacing the sliding door, the pin is moved along a slot of the link control. The slot is a surface of the link control, which presses the pin preferably into different positions during displacement and thus moves the first and the second door leaf in the distance to each other associated with the respective door position. The slots of the link control can be arranged above the door leaves in the door frame.

In particular in the second position, the link control moves the door leaves into a pivoted-out position, in which the first door leaf closes the first door opening and the second door leaf closes the second door opening. Shortly before reaching the second position, the further displacement of the sliding door results in the two door leaves assuming the pivoted-out position due to the interaction with the link control. However, any other designs of the pivoting mechanism are also possible. For example, the pivoting-out of the door can be electronically controlled via an electric or hydraulic drive.

The pivoting mechanism can be deactivated, so that for being able to reach the third position, the sliding door can pass the second position without the door leaves being pivoted out. Since the door leaves are not pivoted out when the pivoting device is deactivated, the sliding door can be moved into the right housing portion of the housing.

If the sliding door has an electronically controlled electric or hydraulic drive, the electronic controller cannot activate the drive in order to deactivate the pivoting mechanism. If the sliding door is activated by an interaction with the link control, the pivoting mechanism can be deactivated in that the engagement of the pin with the slot is lifted by the pin being pulled back out of the slot, for example, or by the link being displaced or removed.

It is possible for the sliding door to be displaceably mounted by means of a linear guide device which comprises, for example, an upper and lower guide rail. At least one of the guide rails can extend beyond the first and second door opening on both sides. A displacement path which the sliding door travels during displacement from the first position along a displacement axis into the third position can, for example, be longer than twice the width of the first or second door leaf. The displacement path can be shorter than three times the width of the first or second door leaf. The displacement path can be limited, for example, by one or more stops, which prevent further displacement of the sliding door and/or the door leaves along the displacement axis in one or both directions.

The pivoting mechanism may be designed, for example, to move the first and second door leaves in opposite directions transversely to the displacement axis of the sliding door. The respective pivoting movements of the first and second door leaves can be coordinated with one another by means of the pivoting mechanism, for example in such a way that the two door openings are closed and/or exposed again as simultaneously as possible by the respective door leaf.

The sliding door can comprise a door leaf support, for example, which is mounted in the housing so as to be displaceable in two opposite directions along a horizontal displacement axis by means of the linear guide device, for example in the intermediate space between the first and second wall parts. The first and second door leaf can be pivotably mounted on the door leaf support by means of the pivoting mechanism. In this case, the pivoting mechanism can be designed to move the first and second door leaves together toward the door leaf support, i.e., move them away from the respective door opening when the door leaf support is displaced into the first position, and/or move them away from the door leaf support, i.e., move the door leaf toward the respective door opening when the door leaf support is displaced into the second position.

The door leaf support can be, for example, a single displaceable support or a displaceable composite of a plurality of individual supports in the form of a support frame, for example.

In particular if the pivoting mechanism is designed as a parallelogram guide, a plurality of parallelogram guides can be arranged such that a first parallelogram guide connects the first door leaf to the door leaf support, and a second parallelogram guide connects the second door leaf to the door leaf support. With linear guides, it is likewise advantageous that a first linear guide connects the first door leaf to the door leaf support, and a second linear guide connects the second door leaf to the door leaf support. As a result, the door leaf support can be displaced on a straight line along the displacement axis.

The second position of the sliding door can be located between the first position and the third position. The second position can be closer to the third position than to the first position.

The sliding door can be displaceable into the third position by displacement in a first direction into the first position and/or by displacement in a second direction opposite the first direction, for example along the horizontal displacement axis.

In other words, it is possible for the sliding door to be displaced, by displacing it into the first position, at least partially beyond a left outer edge of the first and second door opening and by displacing into the third position beyond a right outer edge of the first and second door opening, or vice versa.

For safety reasons, it should only be possible to deactivate the pivoting mechanism when the sliding door is in the completely or partially open state, i.e., in the first position or an intermediate position between the first and second positions, but not in the second position, i.e., in the closed state.

A part of the sliding door that can be displaced beyond the first and second door openings can comprise at least part of the first and/or second door leaf.

It is possible for the first and second door leaves in the first position to be completely outside the first and second door openings and/or in the second position completely between the first and second door openings. In the third position, the first and second door leaves can, for example, be located partially outside the first and second door openings, and partially between the first and second door openings. In other words, it is possible that the first and second door openings are still open a gap in the third position.

The part of the sliding door, which in the third position is accessible via the first and/or second door opening from outside the housing, can be, for example, a part which is not accessible in the first and/or second position via the first door opening and/or the second door opening from outside the housing, for example, because it is then covered by the housing or at least by one or both door leaves.

In addition, the sliding door system can comprise an electric drive device for generating the displacement movement of the sliding door, for example, of the door leaf support.

The electric drive device can comprise an electric motor and electrical and/or electronic components for controlling the electric motor such as in the form of a control unit or a transformer. It is possible for one or more of these components to be arranged on the sliding door, for example, on the door leaf support. By displacing the sliding door into the third position, these components can be displaced so far that they are accessible to a technician via the first and/or second door opening from outside the housing.

Such a sliding door system ensures simple and nevertheless safe installation, servicing and/or repair. The sliding door can be installed and deinstalled by a single person in just a few steps. Nevertheless, the sliding door system is still burglar-proof in that the servicing and/or repair are made possible only when the sliding door is unblocked or unlocked.

A second aspect of the invention relates to a method for servicing a sliding door system according to an embodiment of the first aspect of the invention. The method comprises at least the following steps: deactivating the pivoting mechanism to enable displacing the sliding door beyond the first door opening and the second door opening into the third position, and displacing the sliding door beyond the first door opening and the second door opening into the third position to enable access to the at least one component to be serviced via the first door opening and/or the second door opening from outside the housing and/or removing the sliding door via the first door opening and/or the second door opening from the housing. Thus, with just a few steps, access to components of the sliding door system to be serviced can be ensured. Furthermore, a simple removal of the sliding door as a whole is made possible.

Features of the method according to an embodiment of the second aspect of the invention can also be features of the sliding door system according to an embodiment of the first aspect of the invention and vice versa.

Possible features and advantages of embodiments of the invention can be regarded, inter alia and without limiting the invention, as being based upon the concepts and findings described below.

According to one embodiment, the first door leaf and the second door leaf can be arranged, in the first position at least partially in a left housing portion of the housing located on the left next to the first door opening and the second door opening, in the second position at least partially between the first door opening and the second door opening, and in the third position at least partially in a right housing portion of the housing located on the right next to the first door opening and the second door opening.

The pivoting mechanism serves to change the distance between the first door leaf and the second door leaf. Thus, to reach the first position, the pivoting mechanism makes it possible to guide the door leaves close to one another such that the door leaves can be inserted into the left housing section. In addition, in the second position, the pivoting mechanism makes it possible to spread the door leaves so far apart that the outer surfaces of the door leaves are flush with the outer surface of the housing. Sliding doors with corresponding pivoting mechanisms are known from the documents cited above. The pivoting mechanism can also be called an expansion mechanism.

The terms "left" and "right" are to be understood here in relation to a displacement axis along which the sliding door can be displaced. For example, the first and second door leaf can be arranged completely in the left housing section in the first position without protruding into the first and second door opening. In contrast, in the third position, only a front part of the sliding door can be arranged in the right housing section. In this case, a rear part of the sliding door, which faces the left housing portion, can be arranged between the first and second door openings and thus be accessible from the outside, i.e., from outside the housing. For example, predominantly moving parts of the sliding door system or other components requiring servicing can be arranged in this rear part and can be displaceable together with the sliding door. Also, in the third position, the left housing section can be accessible from outside the housing via the first and/or second door opening. In order to further simplify servicing, predominantly non-moving components or components that do not require servicing during an intended service life of the sliding door system can be arranged in the housing itself. According to an embodiment, the sliding door can be designed such that the component to be serviced is accessible exclusively in the third position.

In other words, the component to be serviced can thus be fastened in the left housing section or on a part of the sliding door which remains in the left housing section of the housing in the first position and in the second position of the sliding door.

The left housing section is only accessible when the sliding door exposes access to the left housing section due to the displacement into the third position.

If the sliding door is displaced from the second position into the third position, regions of the door are accessible which are otherwise not accessible. For example, the left housing section of the housing and a part of the sliding door that otherwise always remains in the left housing section of the housing are thus made accessible. The component to be serviced is accessible exclusively in the third position, i.e., not in the first position and not in the second position.

According to an embodiment, the sliding door can be mounted in the housing by means of a linear guide device so as to be displaceable beyond the first door opening and the second door opening on both sides. The linear guide device can be arranged at least partially in the right housing section. For example, at least one guide rail or at least one guide shoe of the linear guide device can project into the right housing section.

According to an embodiment, a gap between an edge portion of the first door opening and an edge portion of the second door opening can be covered by at least one cover plate. In other words, the housing can be clad or enclosed in the region of the first and second door openings by one or more cover plates such that, when the sliding door is completely or partially open, i.e., when it is in the first position or between the first and second position, it is not possible to look into or access the interior of the housing such as into the right housing portion. The cover plate can be a part of a jamb, for example a head jamb or a lateral jamb.

Preferably, the cover plate covers the right housing section of the housing. As a result, the right housing section of the housing is protected from dirt, and the user can no longer look into the right housing section.

According to an embodiment, the cover plate can be attached to the housing by means of a locking mechanism and can be removed from the housing by unlocking the locking mechanism. It is possible that the locking mechanism can be unlocked only when the sliding door is in the first position and/or between the first position and the second position. The locking mechanism can be unlockable by means of a special tool or a special key. For example, a receptacle for the tool or the key can be covered by the two door leaves in the closed state of the sliding door, and no longer be covered by the two door leaves in the completely or partially opened state of the sliding door, and can thus be accessible from the outside.

According to an embodiment, the first door leaf and the second door leaf can have a greater distance from one another in the second position transversely to a displacement axis along which the sliding door is displaceable than in the first position and/or the third position. In other words, in the closed state of the sliding door, the first and second door leaves can be at least partially recessed in the respective door opening, for example, to close the door openings sufficiently soundproof and/or airtight. The distance in the width direction of the housing between the two door leaves in the pivoted-in state can be selected so that they are displaceable in the housing beyond the door openings in both directions of the displacement axis.

According to an embodiment, the at least one component to be serviced can be arranged on the sliding door. This means that the component(s) to be serviced can be displaced with the sliding door. Access to these component(s) is thus made possible by simply displacing the sliding door into the third position. To do so, no further disassembly processes are required apart from deactivating the pivoting mechanism, which can be deactivated by simply moving or releasing a lever, for example.

According to an embodiment, the sliding door system can further comprise an electric drive device for generating the displacement movement. The at least one component to be serviced can be a component of the electric drive device. Thus, individual components of the electric drive device such as a drive motor, a drive controller or a transformer can be serviced, replaced and/or repaired with little effort.

According to an embodiment, the pivoting mechanism can be accessible at least partially via the first door opening and/or the second door opening from outside the housing when the sliding door is in an intermediate position between the first position and the second position. This can be understood to mean that access to the pivoting mechanism is not possible or at least not possible from outside the housing, in particular not from an outer side of the building wall, provided that the sliding door is in the second position, i.e., in the closed state. For example, after unlocking the sliding door, for example, by means of a door key, the sliding door can initially be displaced so far in the direction of the first position, for example, by means of the electric drive device, until the first and second door leaves are completely pivoted in. In this intermediate position of the sliding door, the pivoting mechanism can then be deactivated, so that the first and second door leaves are not pivoted out again during displacement in the opposite direction, i.e., in the direction of the second and third positions, which would prevent further displacement into the third position under certain circumstances.

According to an embodiment, the housing can further comprise a first door frame which at least partially frames the first door opening. The first door leaf can be at least partially recessed in the first door frame in the second position. Additionally or alternatively, the housing can further comprise a second door frame which at least partially frames the second door opening. The second door leaf can be at least partially recessed in the second door frame in the second position. “Door frame” can be understood to mean, for example, a jamb or a jamb element, for example, in the form of a sheet metal or wooden part. It is possible for the first and/or second door frame to comprise a lip seal for sealing the respective door opening. For example, the lip seal can be compressed by an outer edge portion of the respective door leaf when the respective door panel is at least partially recessed in the respective door frame. Thus, a gap between the housing and the closed sliding door can be effectively sealed, for example for sound insulation or fire protection purposes.

According to an embodiment, the pivoting mechanism can be designed to convert the displacement movement into the pivoting movement such that, in the second position, an outer surface of the first door leaf forms a first flat surface together with an outer surface of the housing adjoining the first door opening. Additionally or alternatively, the pivoting mechanism can be designed to convert the displacement movement into the pivoting movement such that an outer surface of the second door leaf together with an outer surface of the housing adjoining the second door opening forms a second flat surface. In this way, the burglary resistance of the sliding door system in comparison to embodiments with non-flush door leaves can be increased. In addition, it can be achieved in this way that the door leaves hardly stand out visibly from the surrounding building wall when closed, if this is desired.

According to an embodiment, the method can further comprise removing the sliding door from the housing via the first door opening and/or the second door opening starting from the third position. In this way, the sliding door can be removed as a whole from the housing in only a few steps and little effort.

According to an embodiment, the sliding door can be displaced from the third position in the direction of the first position and turned into the first door opening and/or the second door opening. In addition, the sliding door can be tilted in a suitable manner. The sliding door can be removed, for example, by means of a separate removal mechanism and/or by means of the linear guide device (see above). For example, the sliding door can be mounted on two bearing points in the linear guide device, wherein, by releasing the connection of the sliding door to one of the bearing points, the respective other bearing point can function as a pivot point about which the sliding door can now be rotated. However, any other embodiments familiar to the person skilled in the art are also possible.

According to an embodiment, the method can further comprise inserting the sliding door into the housing via the first door opening and/or the second door opening, wherein the sliding door can be brought into the third position, and subsequently activating the pivoting mechanism. For example, insertion can be performed in the reverse order to removal. This ensures a simple replacement of the sliding door.

Embodiments of the invention will be described below with reference to the accompanying drawings, wherein neither the drawings nor the description are intended to be interpreted as limiting the invention.

The drawings are merely schematic, and not to scale. In the different figures, identical reference signs denote identical or similar features.

DETAILED DESCRIPTION

Figure 1:
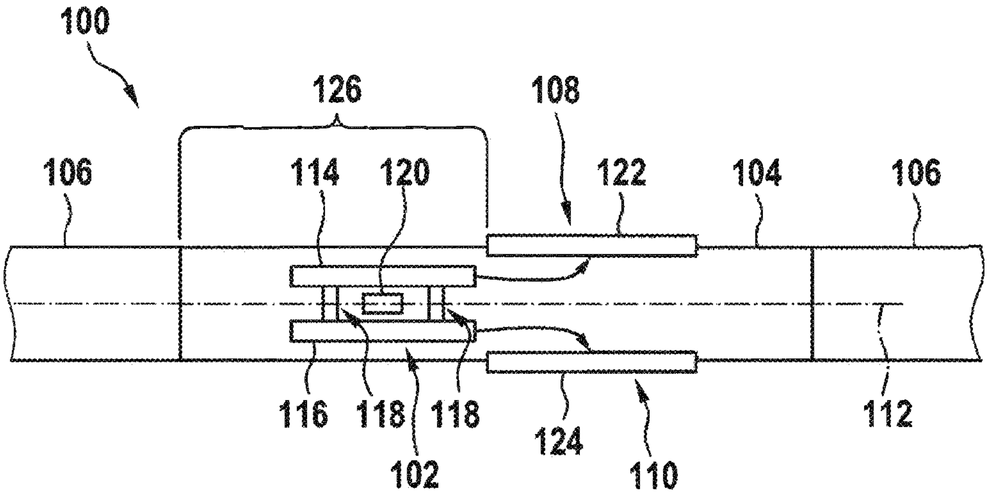
FIG. 1 is a plan view of an installed sliding door system according to an exemplary embodiment of the invention in the open state.

FIG. 1 shows a sliding door system 100 with a sliding door 102 and a housing 104 installed in a building wall 106. The housing 104 has a first door opening 108 and a second door opening 110 which is opposite the first door opening 108. In this example, the sliding door 102 is mounted in the housing 104 so as to be displaceable along a horizontal displacement axis 112 beyond both door openings 108, 110 on both sides, in this case both to the left and to the right from a reference position in front of the second door opening 110.

The sliding door 102 comprises a first door leaf 114 for closing the first door opening 108 and a second door leaf 116 for closing the second door opening 110. The two door leaves 114, 116 are opposite one another in a direction transverse to the displacement axis 112. The two door leaves 114, 116 can be moved in the same direction and synchronized with one another along the displacement axis 112 relative to the door openings 108, 110. The sliding door 102 further comprises a pivoting mechanism 118 which is designed to convert a displacement movement of the sliding door 102, which can be caused, for example, by means of an electric drive device 120 when a corresponding door switch is actuated, into a pivoting movement of the two door leaves 114, 116 (indicated by two arrows), so that the door openings 108, 110 are either closed or opened depending on the direction of displacement of the sliding door 102.

The door leaves 114, 116 can, for example, be pivoted in or out via a parallelogram guide and a link control coupled to the respective parallelogram guide. However, any other embodiments of the pivoting mechanism 118 are also possible.

In addition, the sliding door system 100 comprises a first door frame 122, which at least partially frames the first door opening 108, and a second door frame 124, which at least partially frames the second door opening 110. A suitable door seal for sealing the respective door leaf 114, 116 against the housing 104 and/or the building wall 106 can be integrated into at least one of the two door frames 122, 124.

FIG. 1 shows the sliding door 102, by way of example, in the open state, in which, in this case, the two door leaves 114, 116 are arranged completely in a left (or first) housing portion 126, which is located on the left next to the two door openings 108, 110, and thus completely expose the two door openings 108, 110.

Figure 2:
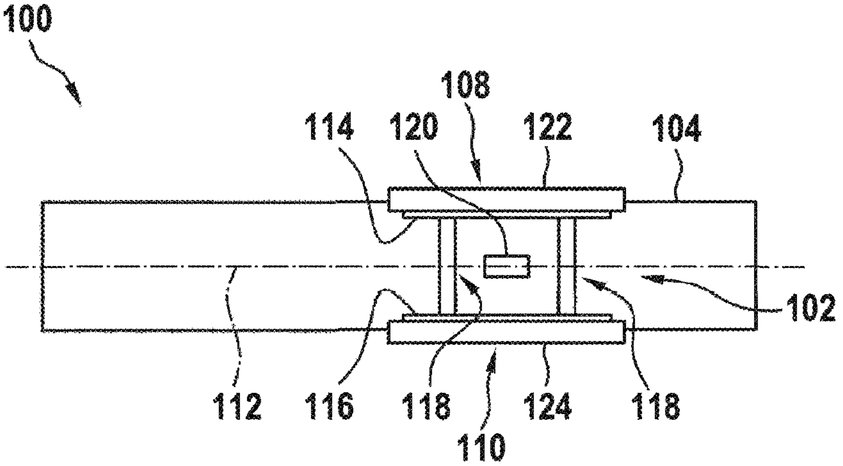
FIG. 2 shows the sliding door system from FIG. 1 in the closed state.

Starting from this first position, the sliding door 102 can be moved into a second position, as shown in FIG. 2. The second position corresponds to a closed state of the sliding door 102, in which the first door opening 108 is completely closed by the first door leaf 114 and the second door opening 110 is completely closed by the second door leaf 116.

It is possible that, when the sliding door 102 is moved into the second position, the two door leaves 114, 116 are both partially recessed in the corresponding door frame 122 or 124 by corresponding pivoting by means of the pivoting mechanism 118, in order to seal the sliding door 102 in a suitable manner and/or to cause the building wall 106 to appear as flat as possible in the closed state of the sliding door 102, i.e., when the sliding door 102 is closed, there is as far as possible no step between a respective outer surface of the door leaves 114, 116 and a corresponding outer surface of the building wall 106. An outer surface of one of the door leaves 114, 116 can in this case be flush with an outer surface of the door frame 122, 124 accommodating the door leaf 114, 116.

Figure 3:
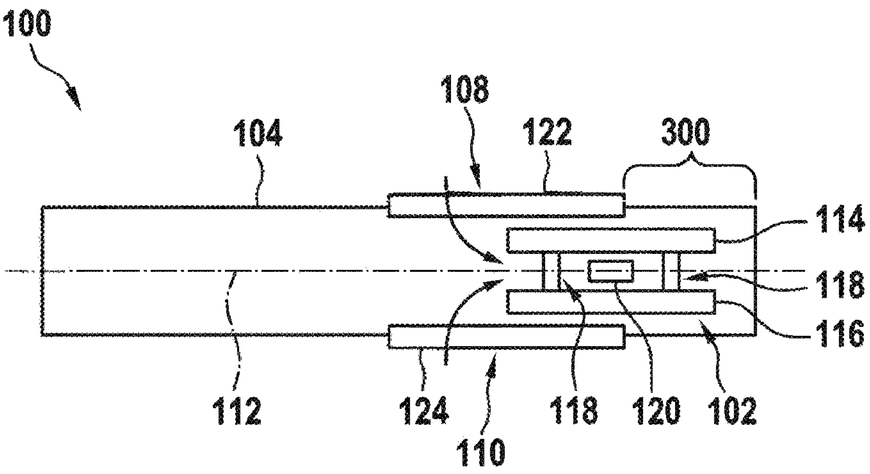
FIG. 3 is a plan view of the sliding door system from FIG. 1 in a servicing state.

In order to service, repair and/or remove the sliding door 102, the sliding door 102 is further displaceable into a third position, as shown by way of example in FIG. 3.

For this purpose, the sliding door 102 can initially be unlocked, for example, and, starting from the second position, can be displaced slightly in the direction of the first position. This may be done manually or by means of the electric drive device 120, so that the door leaves 114, 116 are withdrawn from the respective door opening 108 or 110 by means of the pivoting mechanism 118. In doing so, the mutual distance of the door leaves is reduced transversely to the displacement axis 112.

The pivoting mechanism 118 can now be deactivated in a suitable manner, for example, by releasing a control lever from the link control. If the sliding door 102 is now displaced again in the opposite direction, i.e., in the direction of the second position, the door leaves 114, 116 remain in their previous, pivoted-in state due to the deactivated pivoting mechanism 118, so that the sliding door 102 or at least a front part thereof can be pushed beyond the two door openings 108, 110 into a, in this case, right (or second) housing portion 300, which is located on the right next to the two door openings 108, 110. This enables access to at least a rear part of the sliding door 102, in which rear part, for example, the electric drive device 120 or other components of the sliding door system 100 in need of servicing can be arranged, via at least one of the two door openings 108, 110 from outside the housing 104 (indicated by two arrows in FIG. 3).

Figure 5:
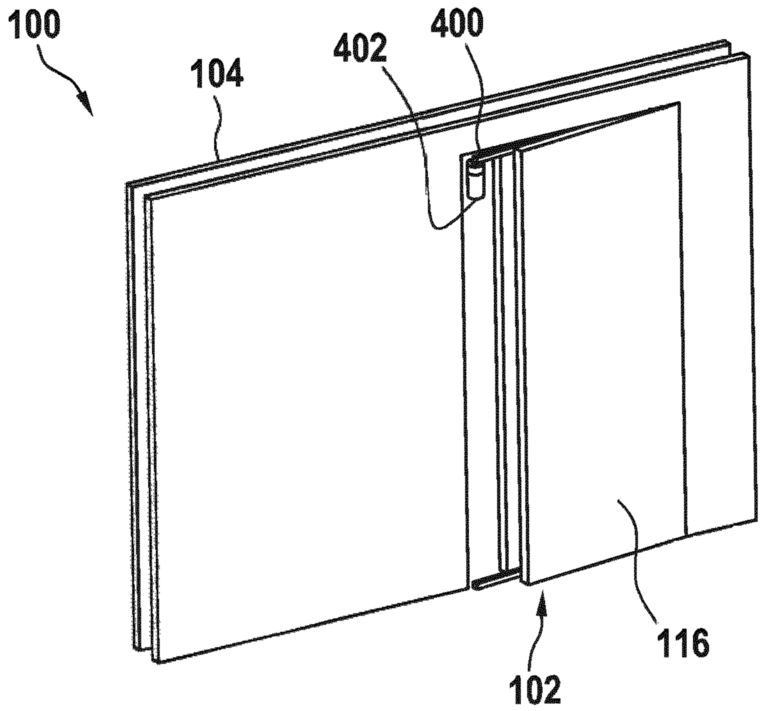
FIG. 5 is a perspective view of a sliding door system according to an embodiment of the invention with a sliding door pivoted out.
Figure 6:
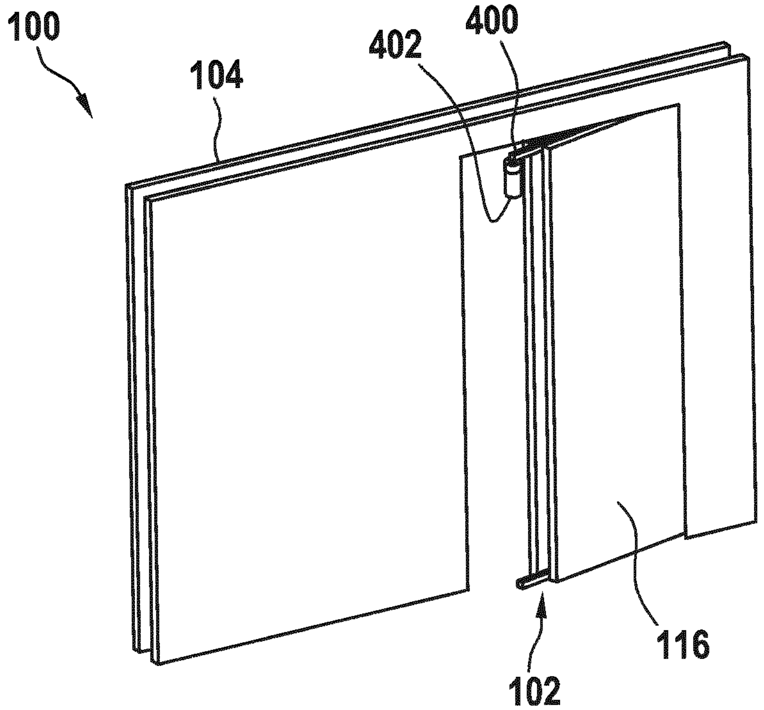
FIG. 6 shows the sliding door system from FIG. 5 with a sliding door pivoted out further.
Figure 7:
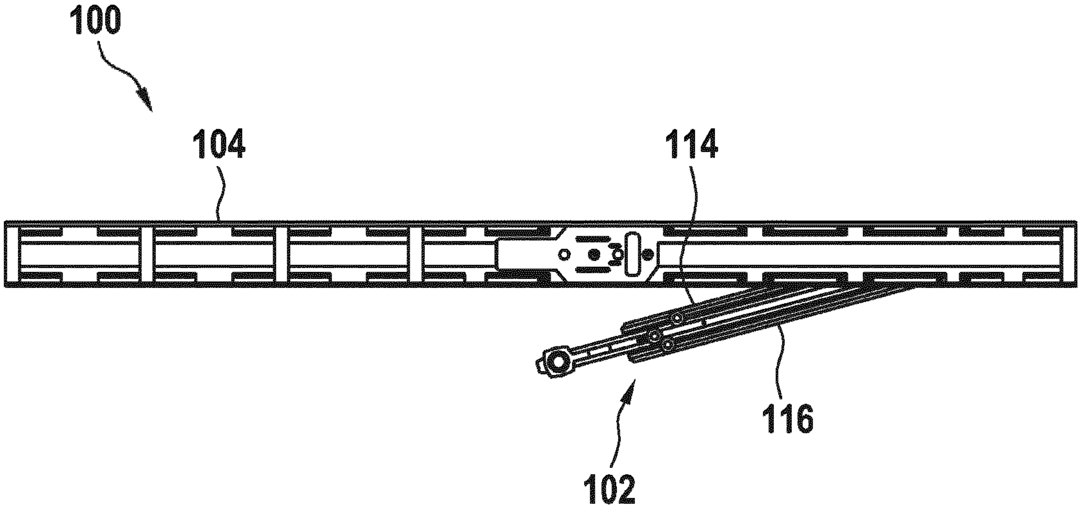
FIG. 7 is a plan view of the sliding door system from FIG. 6.

Furthermore, in this third position, the sliding door 102 as a whole can be removed from the housing 104 in a very simple manner, i.e., without having to be dismantled further into its individual parts, as shown by way of example in FIG. 5 to FIG. 7. FIG. 5 is a perspective view of the sliding door system 100 according to an embodiment of the invention with the sliding door 102 pivoted out. FIG. 6 shows the sliding door system 100 from FIG. 5 with the sliding door 102 pivoted out further. FIG. 7 is a plan view of the sliding door system 100 from FIG. 6.

Figure 4:
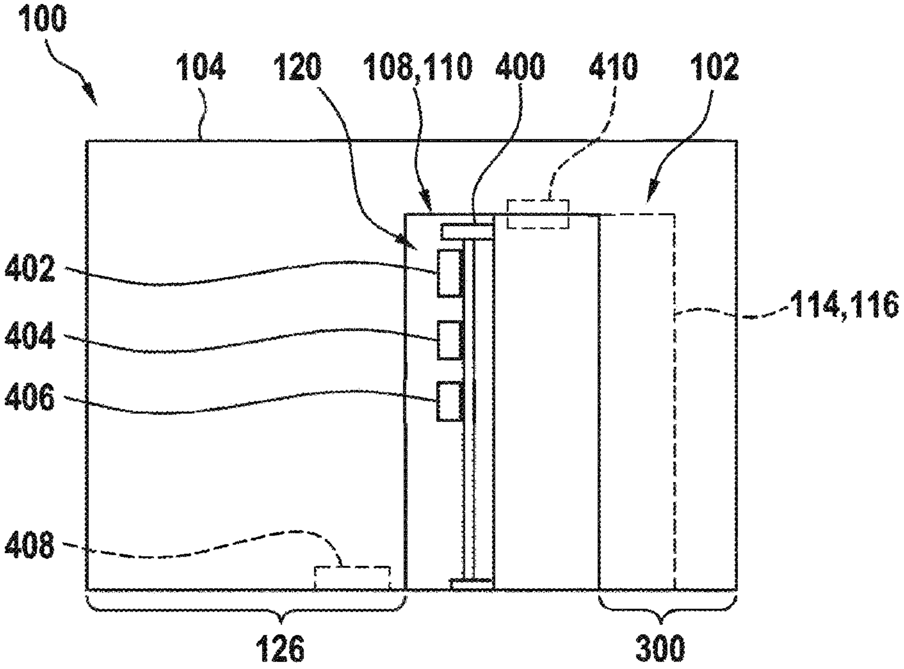
FIG. 4 is a side view of the sliding door system from FIG. 3.

In the side view of the sliding door system 100 shown in FIG. 4, a portion of a door leaf support 400 can be seen, on which the two door leaves 114, 116 can be pivotably mounted by means of the pivoting mechanism 118 (not shown here). For example, components to be serviced, such as a drive motor 402, a drive controller 404 or a ring transformer 406, which can be parts of the electric drive device 120, or other mechanically movable electrical and/or electronic components, can be attached to the rear part of the door leaf support 400. This rear part is easily accessible from the outside in the third position of the sliding door 102, as shown here, via the two door openings 108, 110.

Furthermore, a bottom guide 408 and an top guide 410 arranged offset thereto are shown, which guide the sliding door 102, more precisely the door leaf support 400, during displacement along the displacement axis 112.

FIG. 4 shows, by way of example, the bottom guide 408 arranged in the left housing section 126 and the top guide 410 between the left housing section 126 and the right housing section 300. However, it is also possible for at least one of the two guides 408, 410 to be arranged at least partially in the right housing section 300.

In order to remove the sliding door 102 from the housing 104, it can, for example, be displaced a distance back in the direction of the first position starting from the third position and can thereby be pivoted out of the housing 104 in a suitable manner, as illustrated in FIGS. 5 to 7.

The sliding door 102 can be inserted into the housing 104 analogously to the removal in reverse order.

For better clarity, the building wall 106 has been omitted in FIGS. 2 to 7.

It is noted that the applicant has submitted two further patent applications with the present patent application, which also refer to sliding doors. Embodiments of the sliding doors and their operating principles described therein can optionally also be used in the same or similar manner in embodiments of the invention described herein. The content of the two further patent applications, WO 2022/243037 A1 (EP21173990.9) and WO 2022/243039 A1 (EP21173993.3), is hereby incorporated in its entirety by reference.

Finally, it should be noted that terms such as "comprising," "having," etc. do not exclude other elements or steps, and terms such as "a" or "an" do not exclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding door system for installing into a building wall, the sliding door system comprising:

a sliding door including a first door leaf, a second door leaf, and a pivoting mechanism pivotally mounting the first and second door leaves;

a housing adapted to be installed into the building wall, the housing having a first door opening and a second door opening opposite the first door opening;

wherein the sliding door is mounted in the housing and is displaceable along a displacement axis beyond the first and second door openings on both sides thereof;

wherein the pivoting mechanism converts a displacement movement of the sliding door into a pivoting movement of the first and second door leaves whereby the first door leaf exposes the first door opening and the second door leaf exposes the second door opening in a first position of the sliding door, the sliding door in the first position being arranged completely in a portion of the housing next to the first and second door openings, and the first and second door leaves close the first and second door openings respectively in a second position of the sliding door, the first position being spaced from the second position along the displacement axis; and wherein when the pivoting mechanism is deactivated the sliding door is displaceable beyond the first and second door openings into a third position in which at least one component of the sliding door system is accessible from outside the housing via the first door opening and/or the second door opening, and/or in the third position the sliding door can be removed from the housing via the first door opening and/or the second door opening, the third position being spaced from the first position and from the second position along the displacement axis, wherein when the sliding door is in the first position the first and second door leaves are arranged at least partially in a first housing portion of the housing located next to a side of the first and second door openings, when the sliding door is in the second position the first and second door leaves are arranged at least partially between the first and second door openings, and when the sliding door is in the third position the first and second door leaves are arranged at least partially in a second housing portion of the housing located next to another side of the first and second door openings opposite the first housing portion.

2. The sliding door system according to claim 1 wherein the sliding door is mounted in the housing by a linear guide device and the sliding door is displaceable beyond the first and second door openings on both of the sides, and wherein the linear guide device is arranged at least partially in the first housing portion.

3. The sliding door system according to claim 1 wherein the sliding door is mounted in the housing by a linear guide device and the sliding door is displaceable beyond the first and second door openings on both of the sides, and wherein the linear guide device is arranged at least partially between the first and second housing portions.

4. The sliding door system according to claim 1 wherein the first door leaf and the second door leaf are spaced apart, transversely to the displacement axis of the sliding door, by a first distance in the first position, by a second distance in the second position and by a third distance in the third position, the second distance being greater than the first distance and greater than the third distance.

5. The sliding door system according to claim 1 where the at least one component is arranged on the sliding door.

6. The sliding door system according to claim 1 including an electrical drive device generating the displacement movement of the sliding door and wherein the at least one component is a component of the electric drive device.

7. The sliding door system according to claim 1 wherein the pivoting mechanism is at least partially accessible via the first door opening and/or the second door opening from outside the housing when the sliding door is in an intermediate position between the first position and the second position.

8. The sliding door system according to claim 1 wherein the housing includes a first door frame that at least partially frames the first door opening, the first door leaf being at least partially recessed in the first door frame when the sliding door is in the second position.

9. The sliding door system according to claim 8 wherein the housing includes a second door frame that at least partially frames the second door opening, the second door leaf being at least partially recessed in the second door frame when the sliding door is in the second position.

10. The sliding door system according to claim 1 wherein the pivoting mechanism converts the displacement movement of the sliding door into the pivoting movement such that, in the second position, an outer surface of the first door leaf together with an outer surface of the housing adjoining the first door opening form a first flat surface and/or an outer surface of the second door leaf together with an outer surface of the housing adjoining the second door opening form a second flat surface.

11. A method for servicing the sliding door system according to claim 1, the method comprising the steps of:

deactivating the pivoting mechanism to allow displacement of the sliding door beyond the first and second door openings to the third position; and displacing the sliding door beyond the first and second door openings into the third position to allow access to the at least one component via the first door opening and/or the second door opening from outside the housing, and/or to allow removing the sliding door from the housing via the first door opening and/or the second door opening.

12. The method according to claim 11 including removing the sliding door from the housing via the first door opening and/or the second door opening when the sliding door is in the third position.

13. The method according to claim 12 wherein the removing includes displacing the sliding door from the third position towards the first position and turning the sliding door into the first door opening and/or the second door opening.

14. The method according to claim 12 including inserting the removed sliding door into the housing via the first door opening and/or the second door opening, bringing the sliding door into the third position, and activating the pivoting mechanism.

* * * * *